(No Model.)
J. S. OBER.
TRANSPLANTER.
No. 554,139. Patented Feb. 4, 1896.
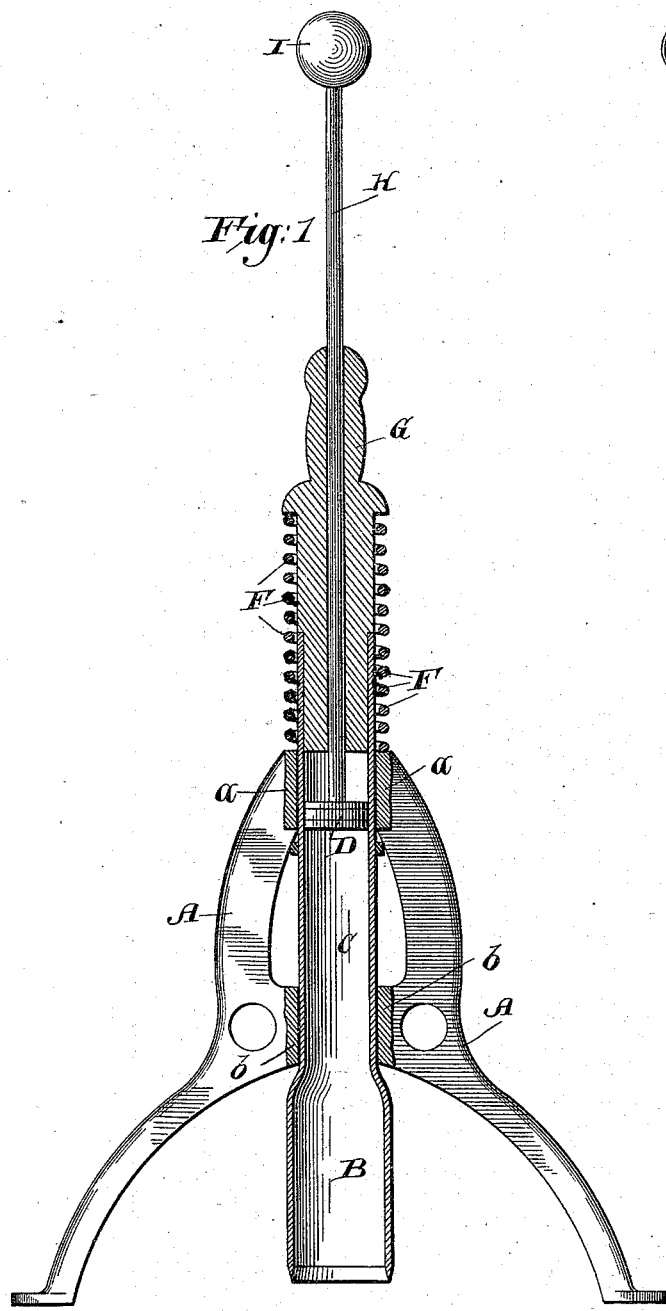
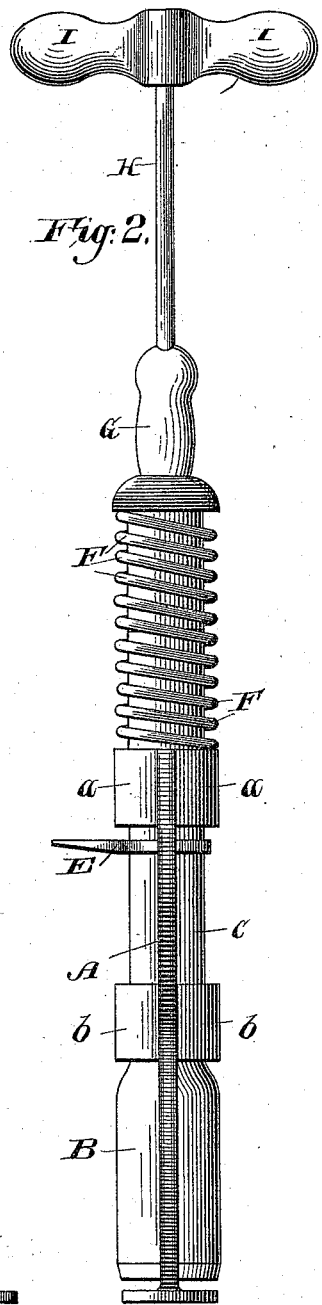
WITNESSES:
H. J. Dieterich
Edw. W. Byrn
INVENTOR
Joseph S. Ober
BY Munn & Co.
ATTORNEYS.

UNITED STATES PATENT OFFICE.

JOSEPH S. OBER, OF RIDGELEY, MARYLAND.

TRANSPLANTER.

SPECIFICATION forming part of Letters Patent No. 554,139, dated February 4, 1896.

Application filed May 18, 1895. Serial No. 549,825. (No model.)

*To all whom it may concern:*

Be it known that I, JOSEPH S. OBER, of Ridgeley, in the county of Caroline and State of Maryland, have invented a new and useful Improvement in Transplanters, of which the following is a specification.

My invention is designed to provide a simple and practical device for performing all the operations of cutting the roots, lifting the plant and transporting and planting it again in a new position without injury to the plant or retardation to its growth.

My invention is in the nature of a pneumatic transplanter, in which I make available an air-pump operating in connection with other devices on the principle of suction to lift the plant out of the soil, and by compression to force the plant and its core of earth out into a hole made for it in planting again, whereby a perfectly even distribution of power is applied to the plant and its core of earth in lifting it out and planting it again without breaking the core of adhering earth or bruising in any way the tender plant.

Figure 1 is a vertical section; and Fig. 2 is a side elevation, the view being taken at right angles to that given in Fig. 1.

A is the supporting stand or framework; B, the tubular transplanting-shell; C, the air-pump cylinder; D, the piston; E, the foot-treadle; F, a spiral spring; G, a hollow handle; H, the piston-rod, and I the hand-hold of the piston-rod.

A is a stand made of iron or other suitable material to hold the machine firmly and in position to force the transplanting-shell into the soil for its various operations. It also forms the lower rest for spring F and is provided with two bearings $a$ $b$ for air-cylinder C to pass through.

B is a cylindrical transplanting-shell sharpened at its lower end, said sharpening to bevel inward or outward, or both, to suit various requirements, and securely fastened at its upper end to the air-cylinder C, of which it is a continuation. Its purpose is to slightly compress the soil and mellow it about the plants, to cut the roots of the plants, and to hold the plants, roots, and soil about them, and deposit same into their new position or location. Said shell may be of the same diameter or larger than the air-cylinder, and may be made from iron, steel, brass, or other suitable material.

C is an air-cylinder fastened at its lower end to shell B and at its upper end to hollow handle G, and made of iron, steel or brass, or other suitable material. It is an air-pump cylinder in which is created a suction to lift the plant and its plug or core of earth by an upward movement of the piston, while by a downward plunge of the piston the air beneath it is compressed and the contents of shell B are discharged into their new position, the earth about which closes upon and securely fastens the plant.

D is a piston fitted into air-cylinder C and fastened to the lower end of piston-rod H, and made of any suitable material adapted to compress the air in air-cylinder C.

F is an open coil spiral spring, preferably made of spring brass wire, and having its lower end resting on the top of stand or frame A and its upper end bearing against the flange or shoulder at the bottom of hollow handle G. The purpose of this spring is to draw up shell B and contents and air-cylinder C, &c., when extracting plants from their original position, and to withdraw simultaneously the said parts of the machine from the opening when the plant is being forced into its new location.

G is a hollow handle, preferably made of wood, through which piston-rod H passes, its lower end being forced tightly into the upper end of air-cylinder C and slightly shouldered or flanged one-fourth of its length from its lower end for spring F to bear against. It is used as a handle to lift the machine, as a central guide for piston-rod H, and as a bearing at the upper end of spiral spring F.

H is a piston-rod, preferably made of iron, its lower end being fastened into piston D and its upper end into hand-hold I.

I is a hand-hold of any suitable form applied to the upper end of piston-rod H and made preferably of wood.

E is a foot bracket or treadle fastened to air-cylinder C by an encircling collar, or otherwise, in such a manner as also to operate as a gage or stop against the guides $a$ and $b$ in its upward and downward movement with the shell B and air-cylinder. It is used to assist in forcing the transplanting-shell into the soil and cutting roots of plants and as a gage to govern the depth of the descent and rise of the transplanting-shell. Spring F may also be applied between treadle E as its upper bearing and the lower bearing in stand A, as may be desired.

The operation of my transplanter is as follows: An opening is made with the machine or other suitable tool where it is desired that the plant shall stand. The machine is then set immediately over the plant to be removed and the transplanting-shell forced down to a suitable depth to cut all side roots and as much deeper as desired to lift the central or tap root. The piston is now pulled up and the plant is held and drawn out by the combined influence of frictional compression and suction, and the shell is then lifted through the medium of spring F, assisted by the operator. The machine is then set immediately over the opening prepared for the plant and the piston is forced downward. The air is thereby compressed in air-cylinder C and the plant quickly and firmly forced into position, and the shell B instantly and simultaneously withdrawn through the medium of the spring F.

From the foregoing it will be seen that the transplanter acts always through the medium of an elastic body of air between the plant and the piston D, the said body of air being a partial vacuum in lifting the plant and a compressed-air cushion in forcing the plant out, so that the tender foliage of the plant is never bruised or mutilated by mechanical contact with the piston.

This machine enables unskilled operators to transplant very small as well as large plants with perfect success. Besides the work can be safely done at any season of the year, because the roots and tops of plants are not injuriously molested, as the plants, roots and soil about them are lifted by suction and frictional compression, and are expelled from the machine by compressed air, which fully avoids any bruising or mutilation of the tender plants.

Having thus described my invention, what I claim as new, and desire to secure by Letters Patent, is—

1. A transplanter having its transplanting-shell combined with a pneumatic attachment for lifting the plant by suction substantially as shown and described.

2. A transplanter having its transplanting-shell combined with a double-acting pneumatic attachment for lifting the plant by suction and expelling it by pneumatic pressure substantially as and for the purpose described.

3. A transplanter having its transplanting-shell combined with a pump-cylinder and a piston for alternately creating a suction and a pressure within the transplanting-shell substantially as and for the purpose described.

4. A transplanter having a shell with sharpened lower edge and extended upwardly in the form of a tight cylinder, a suitable framework with guides for this cylinder, a hollow handle at the top of the cylinder, a spring for lifting it and a piston working within the cylinder and having a rod extending through the hollow handle substantially as and for the purpose described.

5. A transplanter consisting of frame A with guide-bearings $a\,b$, the shell B having cylinder C extended above it in open communication, the hollow handle G, and spring F, the piston D with rod extending through the hollow handle, and the treadle E connected to the cylinder between the guide-bearings $a\,b$ and forming a stop substantially as and for the purpose described.

JOSEPH S. OBER.

Witnesses:
 ROBERT E. SMITH,
 B. F. RICE.